(12) United States Patent
Severinsson

(10) Patent No.: US 10,337,572 B2
(45) Date of Patent: Jul. 2, 2019

(54) ACTUATOR FOR A DOG CLUTCH AND A METHOD FOR ITS CONTROL

(71) Applicant: BorgWarner TorqTransfer Systems AB, Landskrona (SE)

(72) Inventor: Lars Severinsson, Hishult (SE)

(73) Assignee: BorgWarner Sweden AB, Landskrona (SE)

( * ) Notice: Subject to any disclaimer, the term of this patent is extended or adjusted under 35 U.S.C. 154(b) by 67 days.

(21) Appl. No.: 15/117,338

(22) PCT Filed: Jan. 16, 2015

(86) PCT No.: PCT/EP2015/050812
§ 371 (c)(1),
(2) Date: Aug. 8, 2016

(87) PCT Pub. No.: WO2015/121021
PCT Pub. Date: Aug. 20, 2015

(65) Prior Publication Data
US 2016/0356324 A1 Dec. 8, 2016

(30) Foreign Application Priority Data
Feb. 12, 2014 (SE) ...................... 1450150

(51) Int. Cl.
*F16D 11/14* (2006.01)
*F16D 23/14* (2006.01)
(Continued)

(52) U.S. Cl.
CPC ............ *F16D 48/064* (2013.01); *F16D 11/14* (2013.01); *F16D 23/14* (2013.01); *F16D 28/00* (2013.01);
(Continued)

(58) Field of Classification Search
CPC ........ F16H 57/082; F16H 1/28; F16D 48/064; F16D 23/14; F16D 41/00; F16D 11/14; F16D 28/00; F16D 2011/004
See application file for complete search history.

(56) References Cited

U.S. PATENT DOCUMENTS 4,244,455 A 1/1981 Loker
6,082,514 A 7/2000 Averill
(Continued)

FOREIGN PATENT DOCUMENTS

JP 1-144551 U 10/1989
JP 2008304062 A 12/2008
(Continued)

OTHER PUBLICATIONS

Japanese Office Action dated Dec. 4, 2018; Application No. 2016-568113; Applicant: BorgWarner Sweden AB; 3 pages.
(Continued)

*Primary Examiner* — Jacob S. Scott
*Assistant Examiner* — Lillian T Nguyen
(74) *Attorney, Agent, or Firm* — BrooksGroup

(57) ABSTRACT

An actuator for connecting and disconnecting a dog clutch between two coaxial shafts (1, 2) by means of an axially movable clutch sleeve (3) comprises an electric motor. A motor shaft (8) of the motor is connected to a rotatable actuator rod (7). This rod (7) is provided at its end with an eccentric pin (5) for such cooperation with the clutch sleeve (3) that a rotation of the actuator rod (7) 180° or less by means of the motor from a rotational position corresponding to one axial end position of the clutch sleeve (3) to a rotational position corresponding to the other axial end position of the clutch sleeve (3) leads to a connection or disconnection of the dog clutch.

25 Claims, 9 Drawing Sheets

(51) Int. Cl.
    *F16D 48/06*     (2006.01)
    *F16D 28/00*     (2006.01)
    *F16D 41/00*     (2006.01)
    *F16H 1/28*     (2006.01)
    *F16H 57/08*     (2006.01)
    *F16D 11/00*     (2006.01)

(52) U.S. Cl.
    CPC ............... *F16D 41/00* (2013.01); *F16H 1/28* (2013.01); *F16H 57/082* (2013.01); *F16D 2011/004* (2013.01)

(56) References Cited

U.S. PATENT DOCUMENTS

| | | | |
|---|---|---|---|
| 2005/0082134 | A1 | 4/2005 | Bigi |
| 2009/0321170 | A1 | 12/2009 | Guo |
| 2010/0089685 | A1 | 4/2010 | Quehenberger et al. |
| 2011/0102214 | A1 | 5/2011 | Uda |
| 2015/0107955 | A1* | 4/2015 | Tronnberg .............. F16D 28/00 192/69.8 |

FOREIGN PATENT DOCUMENTS

| | | |
|---|---|---|
| JP | 2011101489 A | 5/2011 |
| WO | 2011/043722 | 4/2011 |

OTHER PUBLICATIONS

Chinese Office Action dated Feb. 2, 2019; Application No. 201580008194.2; Applicant: BorgWarner TorqTransfer Systems AB; 11 pages.

\* cited by examiner

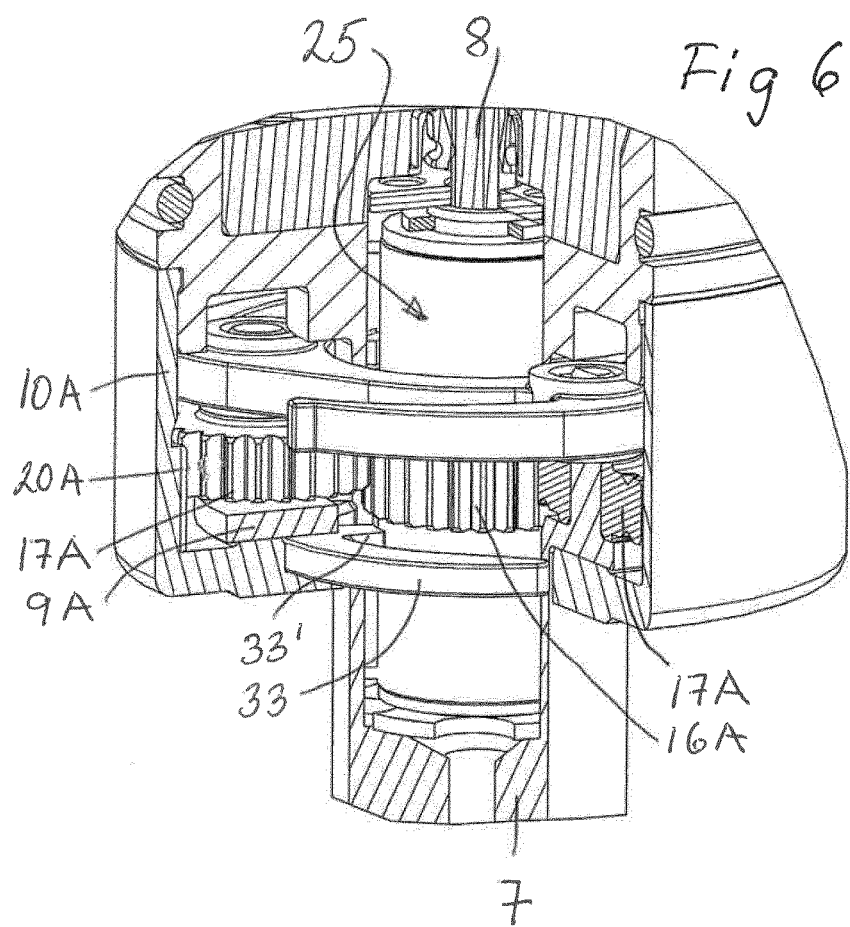

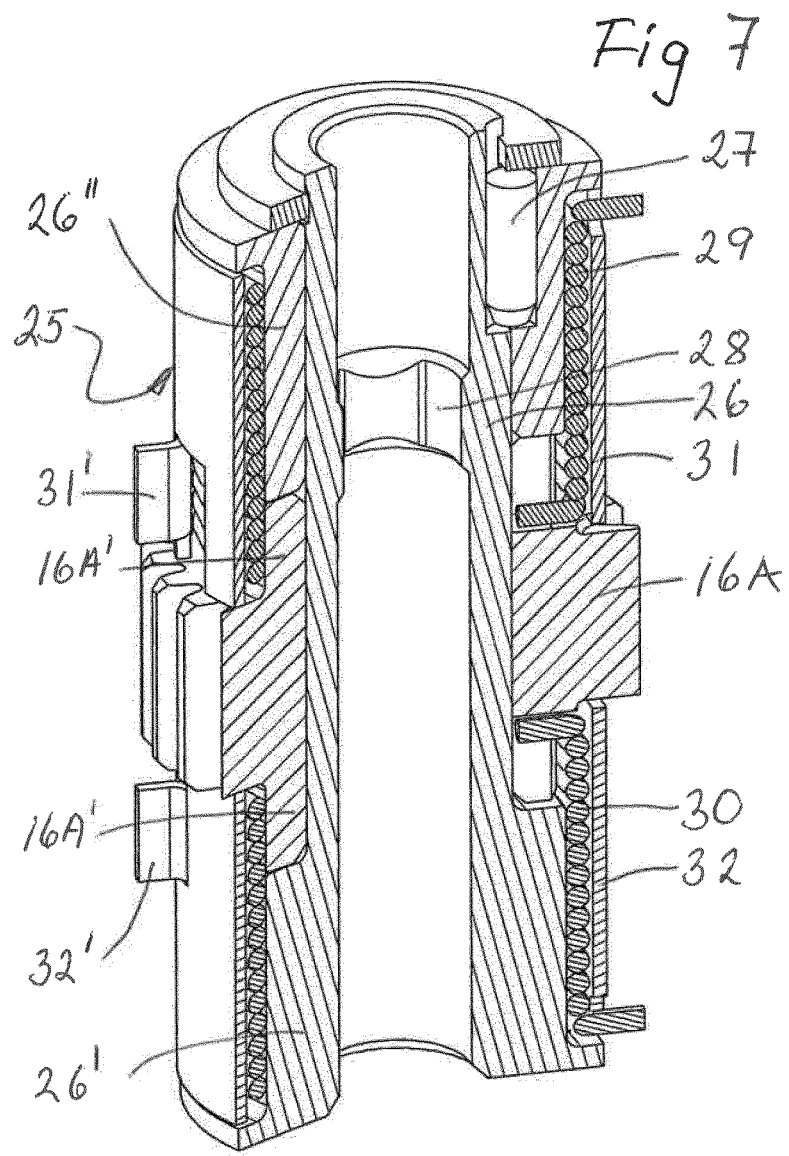

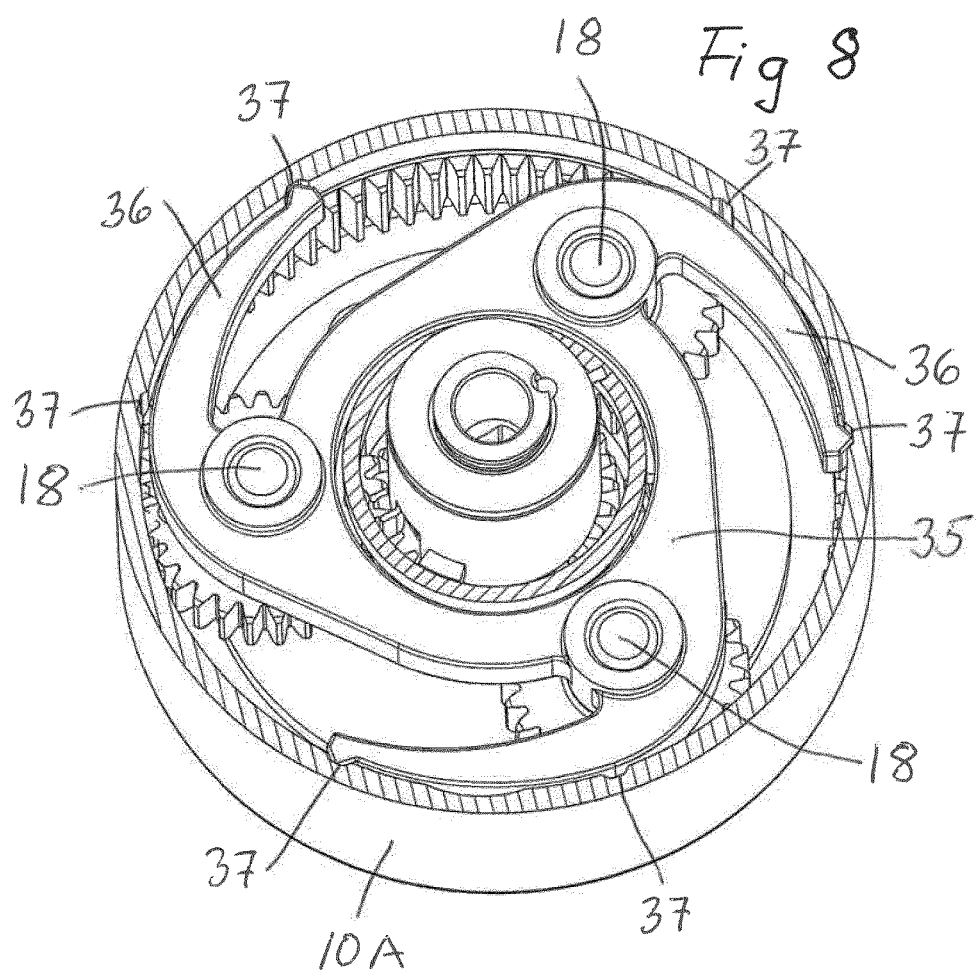

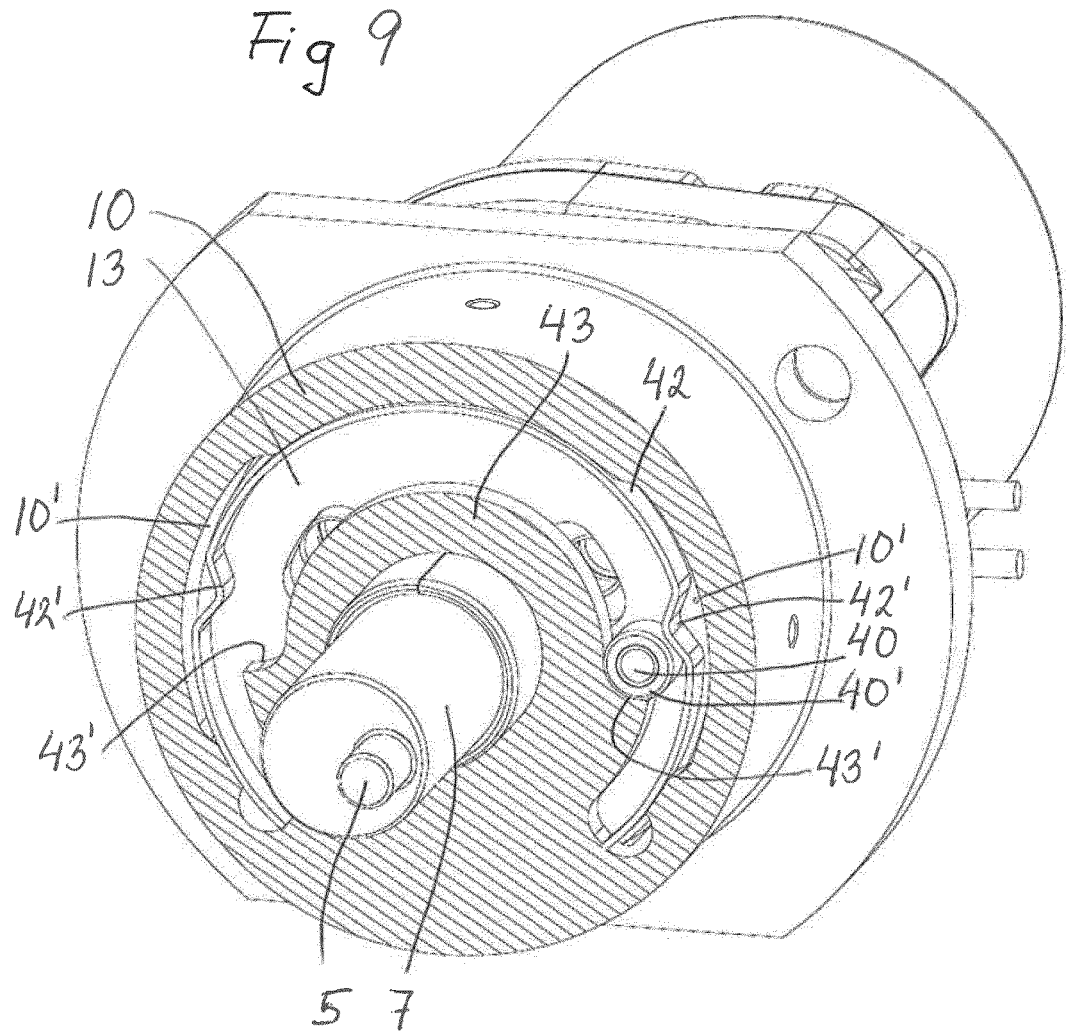

ACTUATOR FOR A DOG CLUTCH AND A METHOD FOR ITS CONTROL

This application claims the benefit of Swedish Application No. 1450150-6 filed Feb. 12, 2014 and PCT Application No. EP2015/050812 filed Jan. 16, 2015.

TECHNICAL FIELD

The present invention relates to an actuator for connecting and disconnecting a dog clutch between two coaxial shafts by means of an axially movable clutch sleeve, the actuator comprising an electric motor. It also relates to a method of controlling such an actuator.

BACKGROUND OF THE INVENTION

A dog clutch of the above kind can be used in many applications, a typical example being in an AWD (All Wheel Drive) vehicle, to which application reference is made in the following.

A drive system of an AWD vehicle may have an engine, a front axle with a differential, and intermediate shaft or cardan shaft, and a rear axle with a differential. In order to control the distribution of the torque not only to the front axle but also to the rear axle in accordance with the driving conditions, an electronically controlled wet disc coupling is arranged in the driveline to the rear axle, often in the intermediate shaft close to the differential.

The function of the coupling when driving the vehicle in an AWD mode is described elsewhere, for example in WO 2011/043722.

When it is desired to drive the AWD vehicle in an FWD (Forward Wheel Drive) mode, the disc coupling is disconnected, i e its discs are separated for preventing them from transmitting any torque. The coupling may be said to be in a disconnect mode. For enhancing this separation effect, the oil normally provided in the coupling for lubricating and cooling its discs can be removed from the coupling. In order to reduce the acceleration of the rotating mass of the intermediate propelling shaft and to eliminate the drag torque in bearings and sealings therefore, a clutch, preferably close to the front axle differential, may be provided to bring the intermediate shaft to a standstill in the FWD mode of the vehicle.

This clutch is preferably a dog clutch with two distinct positions: connected or disconnected. The two coaxial shafts to be connected or disconnected may be provided with end splines, and an axially movable clutch sleeve can be used for the mechanical control of the clutch.

Different patent publications disclose actuators for fast and efficient connection and disconnection of a dog clutch, for example US 2010/0089685. In this design the clutch sleeve is axially transferred by a spring in the direction for connecting the clutch, the direction in which the response requirement is the highest. An electric motor is used for the disconnecting movement and for loading the spring. At an end position a snap mechanism holds the sleeve, and the motor stops. When connection of the clutch is again desired, the motor is further rotated for releasing the snap function, so that the clutch sleeve is free to move axially for connecting the clutch by the spring.

A problem with this technology is that the rotation of the motor has no real connection to the axial movement of the clutch sleeve, and the motor rotation does not provide any information about the position of the clutch sleeve. An important—and in this case lacking—information is whether a correct end position of the sleeve has been reached or splines teeth abut each other, blocking connection of the dog clutch.

For this reason an extra axial position sensor is needed.

THE INVENTION

The mentioned and other problems with known actuators of the mentioned kind may according to the invention be obviated in that a motor shaft of the motor is connected to a rotatable actuator rod, which is provided at its end with an eccentric pin for such cooperation with the clutch sleeve that a rotation of the actuator rod 180° or less by means of the motor from a rotational position corresponding to one axial end position of the clutch sleeve to a rotational position corresponding to the other axial end position of the clutch sleeve leads to a connection or disconnection of the dog clutch.

In a preferred embodiment the eccentric pin extends into an oblong hole in a shift bushing, which is arranged in a circumferential groove in the clutch sleeve. However, other practical solutions for transforming the rotational movement of the eccentric pin into an axial movement of the clutch sleeve are feasible.

In this design with the eccentric pin cooperating with the clutch sleeve and rotating 180° or less (in a practical case say 135°) for accomplishing the desired axial movement of the clutch sleeve, the shorter lever arms towards and in the connect and disconnect positions leads to an increase to a maximum for the current to the electric motor. This current peak may according to an important aspect of the invention be sensed and used as a signal to deenergize the motor. The sensed current peak gives a reliable indication of accurately attained end positions for the shift bushing and thus the dog clutch.

The cylindrical actuator rod is preferably be journaled in an actuator housing at or surrounding the dog clutch.

In a first embodiment the motor shaft is directly connected to the actuator rod, so that no gear reduction is obtained between the motor and the eccentric pin.

For providing a certain elasticity in the force transmission and in the end positions, a spring damping mechanism may be arranged between the motor shaft and the actuator rod.

In a practical design of such a spring damping mechanism a spring disc connected to the motor shaft is rotatably arranged in the actuator housing and is provided with tangential pockets with pairs of preferably somewhat pre-stressed compression springs for cooperation with a spring pin extending into the free space between the two springs from a rod disc, which is connected to the actuator rod.

Three pairs of springs may be provided.

In a second embodiment a gear reduction is provided between the motor shaft and the actuator rod, preferably in the form of a planetary gearing.

In a practical design with a planetary gearing the motor shaft is provided with a sun gear in engagement with planet gears, for example three planet gears, in turn in engagement with a ring gear in the actuator housing, the planet gears being rotatable on gear shafts on a disc-shaped planet carrier, connected to the actuator rod.

The gear reduction of the planetary gearing may for example be four.

Also in the second embodiment the actuator may be provided with a spring damping mechanism as described above, the planet carrier being the spring disc.

In a third embodiment an axial one-way clutch arrangement with at least one unlockable one-way clutch is provided in the force-transmitting chain from the motor shaft to the actuator rod.

In a practical embodiment with two one-way clutches the arrangement comprises a cylindrical inner hub, in which the motor shaft internally engages, a sun gear rotationally arranged on the middle portion of the hub and being part of the planetary gearing as described above, an upper locking spring in firm engagement with an upper portion of the hub and the sun gear, a lower locking spring in firm engagement with the sun gear and a lower portion of the hub, both locking springs being wound in the same direction.

Further, in this practical embodiment an upper locking spring sleeve surrounds the upper locking spring and a lower locking spring sleeve surrounds the lower locking spring, the sleeves being provided with outwardly extending tabs for engagement with respective stop members in the actuator housing.

Preferably, there is provided a snap-ring mechanism for elastically holding the eccentric pin in a respective achieved end position. Hereby, the end position will be maintained even at shocks and vibrations.

In the two first embodiments a snap pin may be attached to a rod disc, from which the actuator rod extends, and a part-circular end stop spring may be arranged against the inside of and attached to the actuator housing, the spring being provided with two inwardly extending spring bosses for engagement with the snap pin and the housing being provided with two end stops for the snap pin in the vicinity of the spring bosses.

In the third embodiment a generally circular body may be mounted to planetary gear shafts of the planetary gearing, the body having elastic arms with end knobs for engagement with either of respective two indentations in the inner periphery of the actuator housing.

The present invention also relates to a method of controlling an actuator for connecting or disconnecting a dog clutch between two coaxial shafts by means of a clutch sleeve, axially movable by means of an electric motor in the actuator.

According to the invention the motor is used for both connecting and disconnecting the clutch, means being provided for transforming the rotational movement of a shaft of the motor into an axial movement of the clutch sleeve in either direction for connecting and disconnecting the clutch, respectively. Further, changes of the motor current at attained connection and disconnection, respectively, and/or during rotation of the motor are used for controlling the motor.

Further, the number of current pulses occurring at the transition of brushes on a rotating segmented commutator in a DC brush motor can be detected as a measurement of the motor rotation.

In the two first embodiments described above the current peak occurring at attained connection and disconnection, respectively, can be detected and used for deenergizing the motor.

In the third embodiment described above the current drop occurring at attained connection and disconnection, respectively can be detected and used for deenergizing the motor.

BRIEF DESCRIPTION OF THE DRAWINGS

The invention will be described in further detail below under reference to the accompanying drawings, in which FIG. 6 is an isometric view, partly in section, of a portion of a third embodiment of an actuator according to the invention, FIG. 7 is an isometric view, partly in section, of a one-way clutch arrangement being a constituent part of the actuator shown in FIG. 6, FIG. 8 is an isometric view, partly in section, of a portion of the actuator shown in FIG. 6, and FIG. 9 is an isometric view, partly in section and from below, of a portion of the actuator shown in FIGS. 2-5.

DESCRIPTION OF EMBODIMENTS

A drive system of an AWD (All Wheel Drive) vehicle is well known in the art. Typical examples are shown in WO 2011/043722. Such a system has an engine, a front axle with a differential, an intermediate shaft or cardan shaft, and a rear axle with a differential. In order to distribute the torque not only to the front axle but also to the rear axle in accordance with the driving conditions, an electronically controlled wet disc coupling is arranged in the driveline to the rear axle, often in the intermediate shaft close to the rear differential.

The function of the coupling when driving the vehicle in an AWD mode is described elsewhere, for example in the mentioned WO 2011/043722.

When it is desired to drive the AWD vehicle in an FWD (Forward Wheel Drive) mode, the disc coupling is disconnected, i e its discs are separated for preventing them from transmitting any torque. The coupling may be said to be in a disconnect mode. For enhancing this separation effect, the oil normally provided in the coupling for lubricating and cooling its discs can be removed from the coupling. In order to reduce the acceleration of the rotating mass of the intermediate propelling shaft and to eliminate the drag torque in bearings and sealings therefore, a clutch, preferably close to the front axle differential, may be provided to bring the intermediate shaft to a standstill in the FWD mode of the vehicle.

The present invention is concerned with such a connect/disconnect dog clutch.

Figure 1:
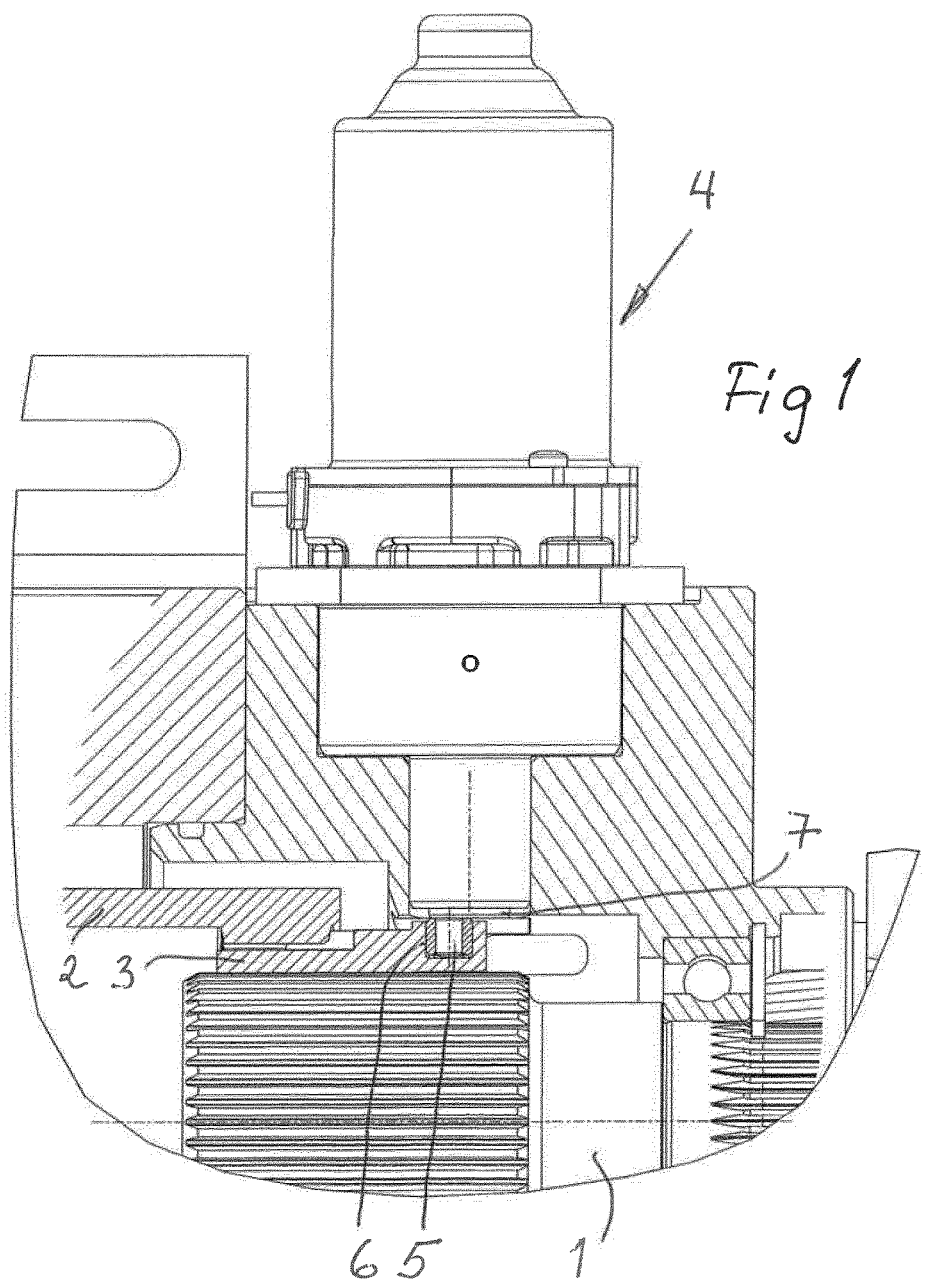
FIG. 1 is an overall view, partly in section, of a dog clutch with an actuator according to the invention.

FIG. 1 is an overall view of a dog clutch arrangement for connecting or disconnecting a normal shaft 1 and a hollow shaft 2, journaled for rotation. The normal shaft 1 is provided with external splines, with which internal splines in a clutch sleeve 3 cooperate. The clutch sleeve 3 is also provided with external teeth for cooperation with internal teeth in the hollow shaft 2. With the clutch sleeve in the position to the left as shown in FIG. 1 the dog clutch between the two shafts 1 and 2 is connected. If the clutch sleeve 3 on the other hand is brought to the right in FIG. 1, the dog clutch between the two shafts 1 and 2 is disconnected.

The present invention is concerned with the means for accomplishing the axial movement of the clutch sleeve 3 between the connect and disconnect positions.

A clutch actuator 4 of a rotary type or in short a rotary clutch actuator is fastened in the housing surrounding the dog clutch and is ended by an eccentric pin 5, which in the shown embodiment extends into a shift bushing 6, guided by the housing and arranged in a circumferential groove in the clutch sleeve 3. The shift bushing 6 has an oblong hole for the eccentric pin 5 to move in. The eccentric pin 5 is mounted eccentrically at the end of a cylindrical actuator rod 7 journaled in the actuator housing. One of or all of the pin 5, the bushing 6, and rod 7 are visible in FIGS. 2-6.

Other practical solutions for transforming the rotational movement of the eccentric pin 5 into an axial movement of the clutch sleeve 3 are feasible.

When the rod 7 with its eccentric pin 5 is rotated 180° from its position in FIG. 1 with the pin 5 to the full left and with the dog clutch in its fully connected condition, the pin 5 will reach its full right position with the dog clutch fully disconnected.

A smaller rotation of the eccentric pin 5 than 180° (for example 135°) can be allowed. However, it is of importance that the pin 5 is to the full left at the connected position of the dog clutch, so that the force from the motor on the clutch sleeve 3 is at its maximum at the beginning of the disconnecting movement. Also, the connection movement will be faster with a shorter rotation, for example 135°.

Figure 2:
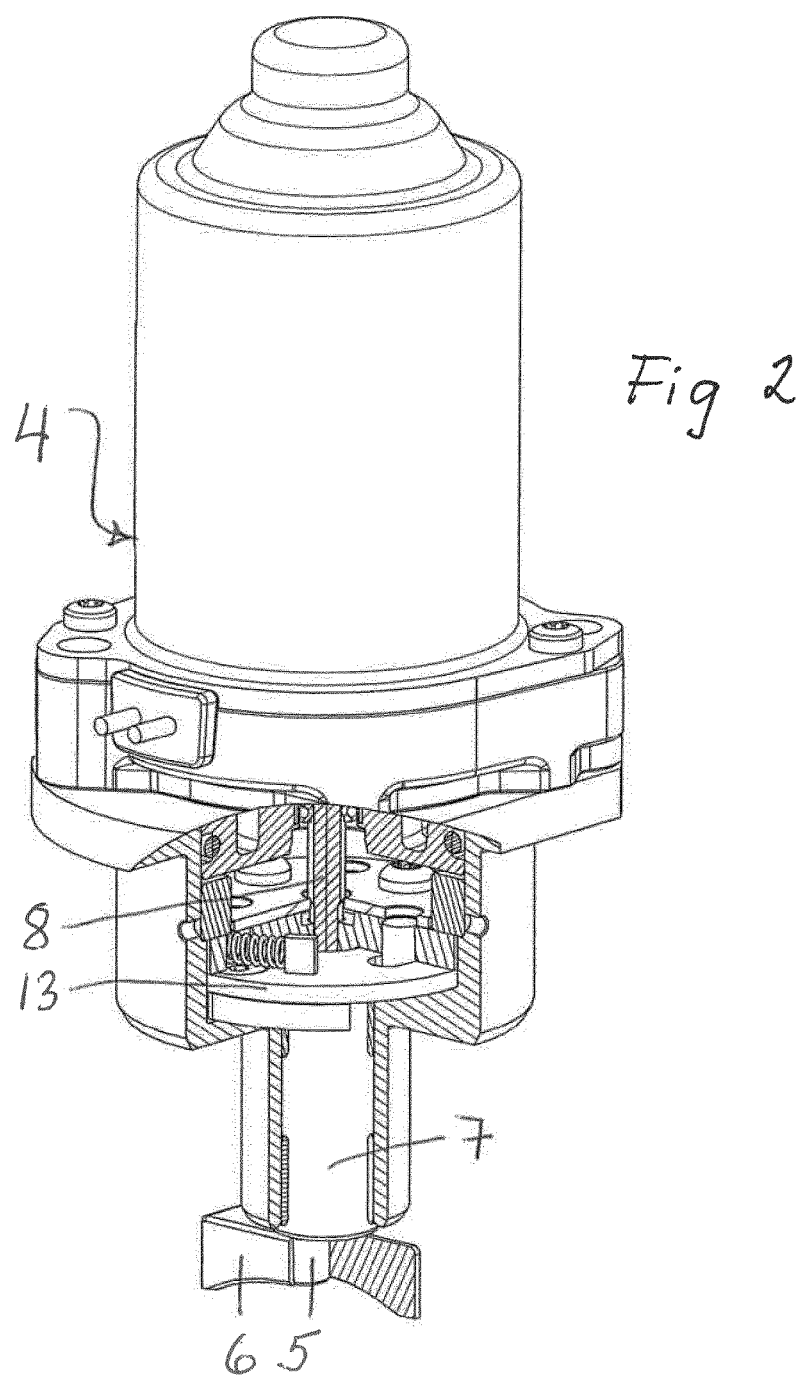
FIG. 2 is an isometric view, partly in section, of a first embodiment of an actuator according to the invention.
Figure 3:
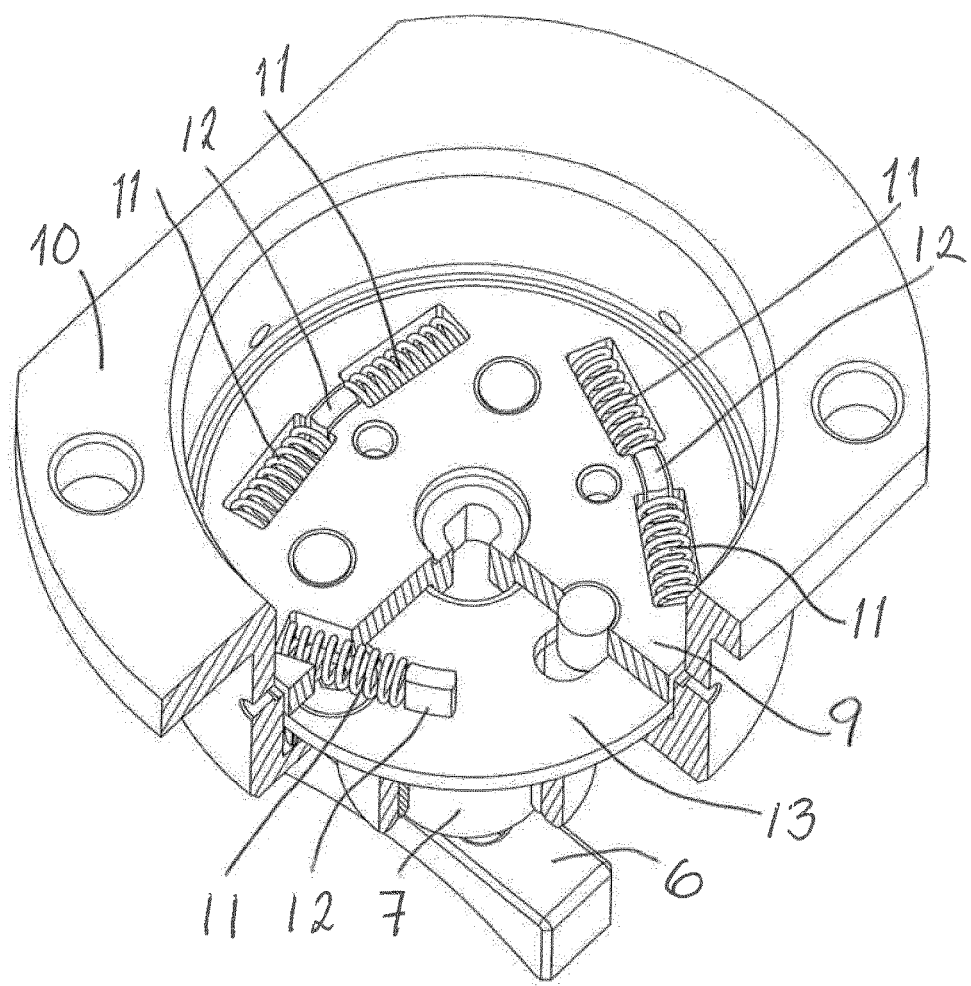
FIG. 3 is an isometric view, partly in section, of a portion of the actuator shown in FIG. 2.

A first embodiment of a rotary clutch actuator 4 is shown in FIGS. 2 and 3. An electric motor is mounted therein, and only its motor shaft 8 is shown in FIG. 2. In this embodiment there is no gear reduction from the motor shaft 8 to the actuator rod 7, but these members are preferably connected by means of a spring damping mechanism to be described with special reference to FIG. 3.

A spring disc 9 is rotatably arranged in an actuator housing 10 and is connected to the motor shaft 8 (FIG. 2). In suitable, tangential pockets therefore, the spring disc 9 is provided with pairs of preferably somewhat presstressed compression springs 11 for cooperation with a spring pin 12 extending into the free space between the two springs 11 from a rod disc 13, which is connected to the actuator rod 7. In the shown example there are three pairs of springs 11.

The result is that the actuator rod 7 will normally follow the rotary movements of the motor shaft 8. However, the described spring damping mechanism will provide some elasticity in the force transmission and in the end stops. Especially, the mechanism is useful at a connect operation with teeth against teeth in the splines engagement.

Figure 4:
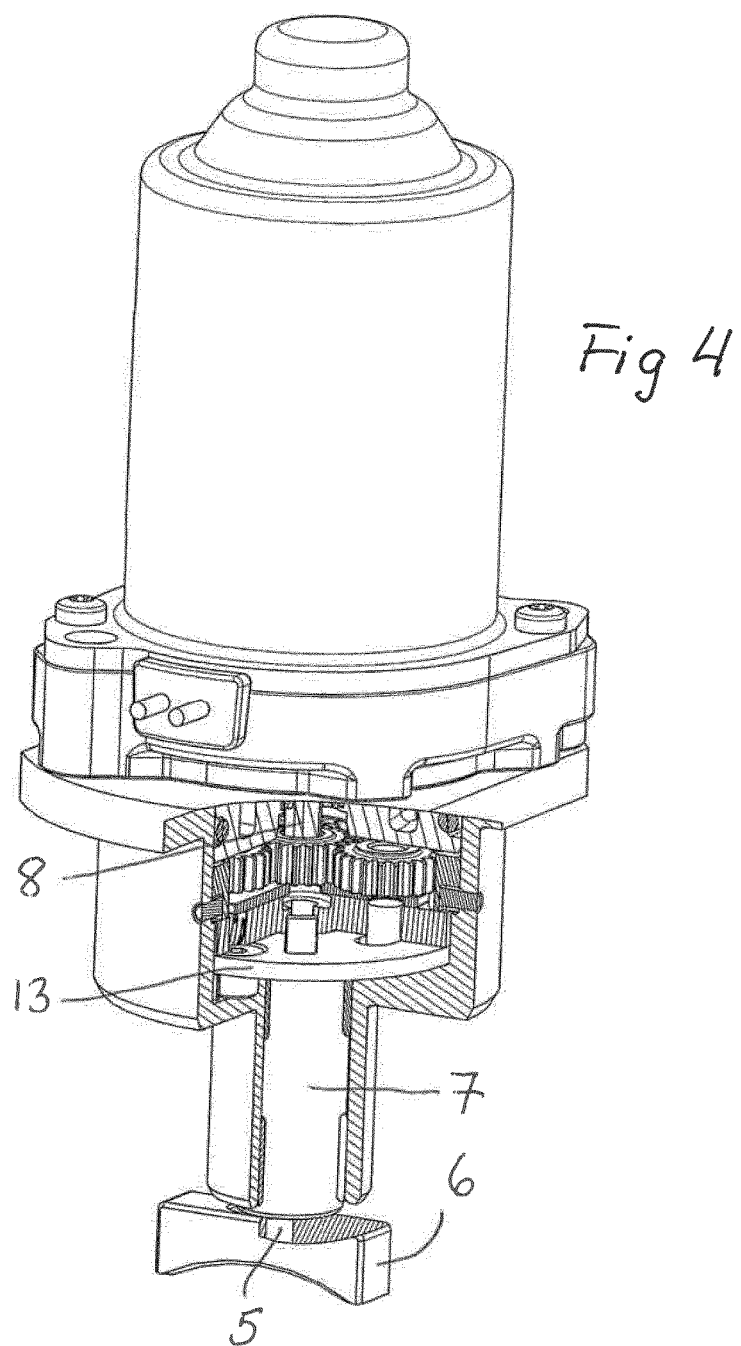
FIG. 4 is an isometric view, partly in section, of a second embodiment of an actuator according to the invention.
Figure 5:
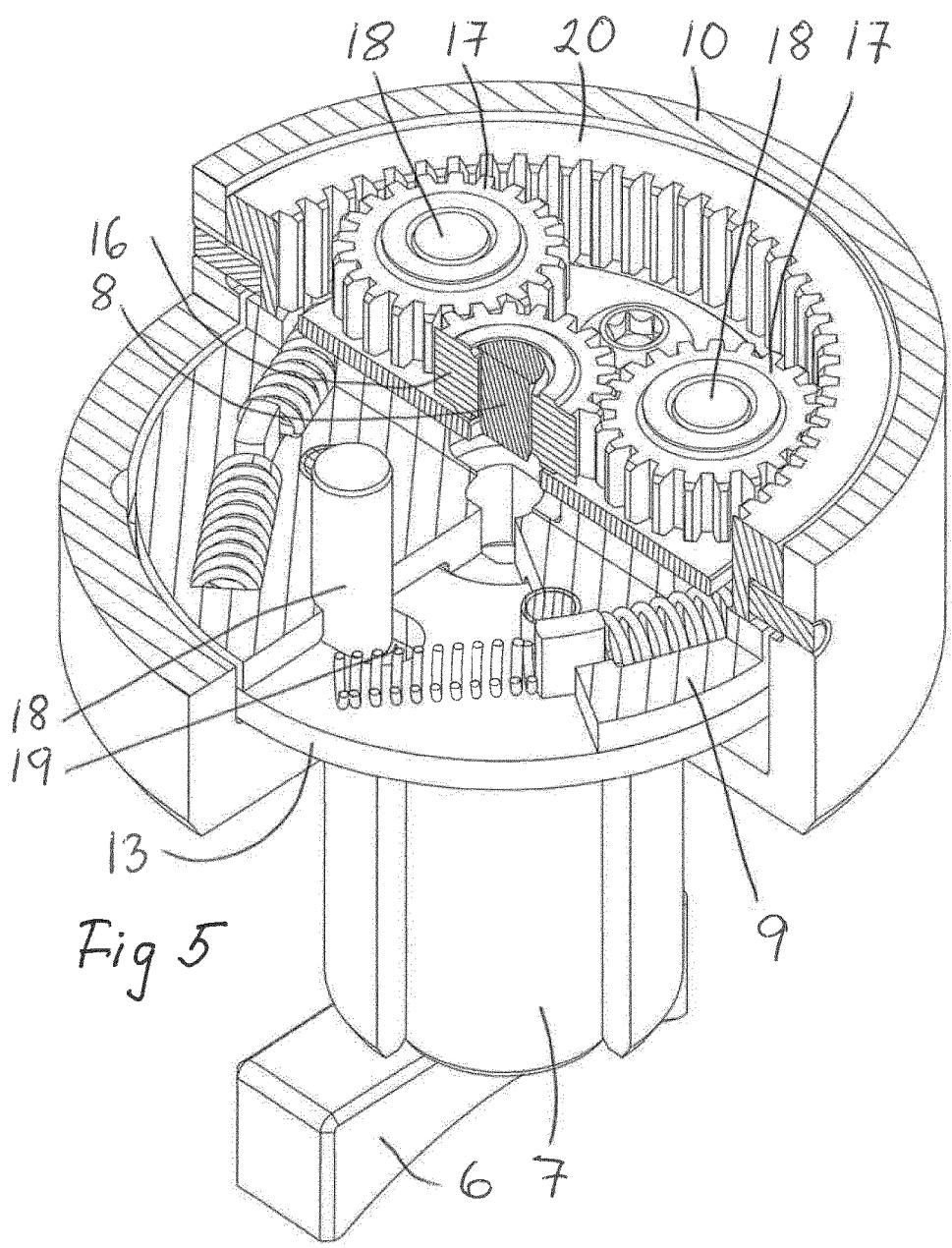
FIG. 5 is an isometric view, partly in section, of a portion of the actuator shown in FIG. 4.

A second embodiment of an actuator according to the invention is shown in FIGS. 4 and 5. The main difference in relation to the first embodiment is the provision of a gear reduction between the motor shaft 8 and the actuator rod 7. This gear reduction is here exemplified by a planetary gearing, but other gear constructions are equally feasible.

A sun gear 16 is connected to the motor shaft 8. For example three planetary gears 17 are rotatably journaled to a planetary carrier, which is the spring disc 9, described in relation to the first embodiment. Only two planetary gears 17, rotatable on gear shafts 18, are shown in FIG. 5. The third gear shaft 18 is illustrated without any planetary gear in order to show that it extends down into a long hole 19 in the rod disc 13, so that the relative rotary movement between the spring disc 9 and the rod disc 13 is limited. A ring gear 20 is connected to the actuator housing 10.

In the shown example the chosen gear reduction may be six, but other reductions are equally feasible.

It appears that the second embodiment according to FIGS. 4 and 5 is provided with a spring damping arrangement of the same kind as the first embodiment, but not all reference numerals for this arrangement are used in FIGS. 4 and 5 for the sake of clarity.

A third embodiment of an actuator according to the invention is shown in FIGS. 6-8. The entire actuator is not shown in FIG. 6, only the portion thereof which is of importance for a proper general understanding. In this embodiment use can be made of a planetary gearing of the same type as in the second embodiment. On the other hand the third embodiment is not shown provided with any spring damping mechanism as the first and second embodiments. The reason for this is that—as will appear—the motor is disengaged in end positions. However, the situation with teeth against teeth at connection may still occur, which means that an additional one-way slip coupling on the motor shaft 8 or elsewhere may need to be provided. Alternatively, a spring mechanism may be provided.

Also, in the second and third embodiments the spring dampening mechanism may be provided elsewhere in the planetary gearing.

Shown in FIG. 6 is a motor shaft 8 extending down into a one-way clutch arrangement 25 to be described with special reference to FIG. 7. A sun gear 16A is a part of the one-way clutch arrangement 25 and is in gear engagement with planetary gears 17A on a planetary carrier 9A, which in turn is connected to a cylindrical actuator rod 7. The planetary gears 17A are also in gear engagement with a ring gear 20A in an actuator housing 10A.

The one-way clutch arrangement 25 is shown in FIG. 7 and has a cylindrical inner hub 26. For production reasons, this hub 26 consists of two parts: a primary hub 26' and a secondary hub 26", rotationally locked to each other by means of a pin 27.

The sun gear 16A is rotationally arranged on the middle portion of the hub 26. The sun gear 16A has cylindrical sun gear flanges 16A' extending axially in both directions. The outer diameter of these two flanges 16A' is the same as the outer diameter of the hub 26.

The hub 26 is internally provided with engagement means 28 for the motor shaft 8 to engage for common rotation.

An upper locking spring 29 is in firm engagement with the upper sun gear flange 16A' and the upper portion of the hub 26, whereas a lower locking spring 30 is in firm engagement with the lower sun gear flange 16A' and the lower portion of the hub 26. Both locking springs 29, 30 may be right hand wound.

The upper end of the upper locking spring 29 is in engagement with an upper locking spring sleeve 31 (surrounding the upper locking spring 29), whereas its lower end is in engagement with the upper sun gear flange 16A'. Correspondingly, the lower end of the lower locking spring 30 is in engagement with a lower locking spring sleeve 32 (surrounding the lower locking spring 30), whereas its upper end is in engagement with the lower sun gear flange 16A'.

The upper locking spring sleeve 31 is provided with an outwardly extending tab 31' for locking spring opening engagement with a first stop member in the actuator housing 10A, whereas the lower locking spring sleeve 32 is provided with an outwardly extending tab 32' for locking spring opening engagement with a second stop member in the actuator housing 10A.

As is well known in the art, a locking spring of the kind used in the present application will provide rotational locking between the two members that it is wound about in one rotational direction and a free-wheeling effect with a low frictional torque in the opposite rotational direction.

When the hub 26 is rotated by the motor shaft 8 in one direction, one of the locking springs 29 or 30 transmits torque to the sun gear 16A, until the tab 31' or 32' of the relevant sleeve 31 or 32 reaches its stop member in the actuator housing 10A, so that the locking effect of the relevant locking spring 29 or 30 disappears. The sun gear 16A stops its rotation, and the hub 26 may rotate with only a certain friction (the locking spring slips in the freewheeling direction).

Now the motor current drops sharply, which is a distinct indication that an end position has been reached. The motor can be stopped.

If the motor then is rotated in the other direction, the other of the locking springs 29 or 30 transmits torque to the sun gear 16A, until the other tab 31' or 32' reaches its stop member in the actuator housing 10A. The rotational distance between the two tabs 31' and 32' may be 320°.

If the locking springs 29 and 30 are right hand wound, the lower locking spring 30 is locked, if the motor is rotated clockwise seen from above, and vice versa.

In the third embodiment two one-way clutches as shown and described are provided. Modifications are possible. It is of importance, however, that at least one one-way clutch is unlockable for attaining a safe signal at clutch connection.

Shown in FIG. 6 is a bow-shaped element 33, mounted in the actuator housing 10A and provided with an inwardly extending knob 33', which constitutes the stop member for the lower tab 32'.

A snap-ring mechanism for the third embodiment is shown in FIG. 8, but also less clearly in FIG. 6. The purpose of this mechanism is to provide an elastic end stop and to elastically hold the eccentric pin 5 in a respective achieved end position, for example against vibrations and shocks, when the motor has zero current.

This mechanism may consist of a generally circular body 35 mounted on the three gear shafts 18 and having three arms 36, each with an end knob for engaging either of two indentations 37 in the inner periphery of the actuator housing 10A in a respective end position of the eccentric pin 5. The snap-ring mechanism may preferably be made of plastic for providing a certain elasticity to the arms 36, but the desired elasticity may be obtained in another way. By the mounting of the mechanism to the three gear shafts 18 it will be rotationally connected to the eccentric pin 5.

A slightly different snap ring mechanism for the two first embodiments according to FIGS. 2-5 is shown in FIG. 9. The purpose of this mechanism is generally the same as of the one shown in FIG. 8.

This mechanism is shown from below. Visible in FIG. 9 is the actuator housing 10, the actuator rod 7, the eccentric pin 5, and the rod disc 13.

A snap pin 40, preferably provided with a rotatable ring 40', is attached to the rod disc 13. A generally part-circular end stop spring 42 is arranged against the inside of and attached to the actuator housing 10. The spring 42 is provided with two inwardly extending spring bosses 42' at an angular distance from each other of slightly less than 180°.

The actuator housing 10 is provided with an inner housing portion 43, which surrounds the actuator rod 7 and along which the snap pin moves at the rotation of the actuator rod 7. The housing portion 43 is provided with two end stops 43' at an angular distance from each other of slightly more than 180°.

After having passed a spring boss 42' the snap pin 40 of a rotating actuator rod 7 will be stopped by the respective end stop 43' and held resiliently in this position by the respective spring boss 42'.

The electric motor used in the shown and described clutch actuator 4 is preferably a DC motor rotating in both directions, so that the eccentric pin 5 may move the clutch sleeve 3 axially to and fro between connect and disconnect positions. The used motor is a brush motor, in which the current is transferred to the rotating part by means of brushes (usually two brushes) in engagement with a commutator. The commutator has a number of segments. In the transition of the brushes between segments certain current peaks or pulses occur, which may be detected in an ECU associated with the actuator.

In the first and second embodiment a fully connected clutch may be detected by one or more of the following:
 counting commutator pulses (for example 18 pulses);
 calculating rotation from measurements of voltage and current;
 measuring high current at end position; and
 sensing speed of the propeller or cardan shaft by means of a sensor.

A fully disconnected clutch may be detected by:
 sensing speed of the propeller shaft; and
 counting commutator pulses, calculating rotation and high current at end position.

In the first and second embodiments there are elastic stop means for stopping the movement, when the respective end position has been reached.

In the third embodiment one-way clutches will disconnect, when the respective end position has been reached. The motor could continue to rotate but will in practice be switched-off due to the current drop, when an end position is reached.

Modifications are possible within the scope of the appended claims.

The invention claimed is:

1. An actuator for connecting and disconnecting a dog clutch between two coaxial shafts by means of an axially movable clutch sleeve, the actuator comprising an electric motor, wherein a motor shaft of the motor is connected to a rotatable actuator rod, which is provided at an end of the actuator rod with an eccentric pin for such cooperation with the clutch sleeve that a rotation of the actuator rod 180° or less by means of the motor from a rotational position corresponding to one axial end position of the clutch sleeve to a rotational position corresponding to the other axial end position of the clutch sleeve leads to a connection or disconnection of the dog clutch.

2. The actuator according to claim 1, wherein the eccentric pin extends into an oblong hole in a shift bushing, which is arranged in a circumferential groove in the clutch sleeve.

3. The actuator according to claim 1, wherein the actuator rod is journaled in an actuator housing at or surrounding the dog clutch.

4. The actuator according to claim 3, wherein the motor shaft is directly connected to the actuator rod.

5. The actuator according to claim 4 wherein a snap pin is attached to a rod disc, from which the actuator rod extends, and a part-circular end stop spring is arranged against the inside of and attached to the actuator housing, the spring being provided with two inwardly extending spring bosses for engagement with the snap pin and the housing being provided with two end stops for the snap pin in the vicinity of the spring bosses.

6. The actuator according to claim 3, wherein a gear reduction is provided between the motor shaft and the actuator rod.

7. The actuator according to claim 6, wherein the gear reduction is in the form of a planetary gearing.

8. The actuator according to claim 7, wherein the motor shaft is provided with a sun gear in engagement with planet gears in engagement with a ring gear in the actuator housing, the planet gears being rotatable on gear shafts on a disc-shaped planet carrier, connected to the actuator rod.

9. The actuator according to claim 8, wherein the gear reduction of the planetary gearing is six.

10. The actuator according to claim 8, wherein the planet carrier is a spring disc.

11. The actuator according to claim 7 wherein a snap pin is attached to a rod disc, from which the actuator rod extends, and a part-circular end stop spring is arranged against the inside of and attached to the actuator housing, the spring being provided with two inwardly extending spring bosses for engagement with the snap pin and the housing being provided with two end stops for the snap pin in the vicinity of the spring bosses.

12. The actuator according to claim 3, wherein an axial one-way clutch arrangement with at least one unlockable one-way clutch is provided in a force-transmitting chain from the motor shaft to the actuator rod.

13. The actuator according to claim 12, wherein the one-way clutch arrangement comprises a cylindrical inner hub, in which the motor shaft internally engages, a sun gear rotationally arranged on the middle portion of the hub, an upper locking spring in firm engagement with an upper portion of the hub and the sun gear, a lower locking spring in firm engagement with the sun gear and a lower portion of the hub, both locking springs being wound in the same direction.

14. The actuator according to claim 13, wherein an upper locking spring sleeve surrounds the upper locking spring and a lower locking spring sleeve surrounds the lower locking spring, the sleeves being provided with outwardly extending tabs for engagement with respective stop members in the actuator housing.

15. The actuator according to claim 13 wherein a generally circular body is mounted to planetary gear shafts of the planetary gearing, the body having elastic arms with end knobs for engagement with either of respective two indentations in the inner periphery of the actuator housing.

16. The actuator according to claim 3, wherein there is provided a snap-ring mechanism for elastically holding the eccentric pin in a respective achieved end position.

17. The actuator according to claim 16 wherein a snap pin is attached to a rod disc, from which the actuator rod extends, and a part-circular end stop spring is arranged against the inside of and attached to the actuator housing, the spring being provided with two inwardly extending spring bosses for engagement with the snap pin and the housing being provided with two end stops for the snap pin in the vicinity of the spring bosses.

18. The actuator according to claim 16 wherein a generally circular body is mounted to planetary gear shafts of the planetary gearing, the body having elastic arms with end knobs for engagement with either of respective two indentations in the inner periphery of the actuator housing.

19. The actuator according to claim 1, wherein a spring damping mechanism is arranged between the motor shaft and the actuator rod.

20. The actuator according to claim 19, wherein a spring disc connected to the motor shaft is rotatably arranged in the actuator housing and is provided with tangential pockets with pairs of compression springs for cooperation with a spring pin extending into the free space between the two springs from a rod disc, which is connected to the actuator rod.

21. The actuator according to claim 20, wherein there are three pairs of springs.

22. A method of controlling an actuator for connecting or disconnecting a dog clutch between two coaxial shafts by means of a clutch sleeve, axially movable by means of an electric motor in the actuator, wherein the motor is used for both connecting and disconnecting the clutch, wherein a motor shaft of the motor is connected to a rotatable actuator rod, which is provided at an end of the actuator rod with an eccentric pin for such cooperation with the clutch sleeve that a rotation of the actuator rod 180° or less by means of the motor from a rotational position corresponding to one axial end position of the clutch sleeve to a rotational position corresponding to the other axial end position of the clutch sleeve leads to a connection or disconnection of the dog clutch, and that changes of a motor current at attained connection and disconnection, respectively, and/or during rotation of the motor are used for controlling the motor.

23. The method according to claim 22, wherein a number of current pulses occurring at a transition of brushes on a rotating segmented commutator in a DC brush motor are detected.

24. The method according to claim 22 wherein a current peak occurring at attained connection and disconnection, respectively, is detected.

25. The method according to claim 22 wherein a current drop occurring at attained connection and disconnection, respectively is detected.

* * * * *